United States Patent
Sasano et al.

(10) Patent No.: US 8,468,973 B2
(45) Date of Patent: Jun. 25, 2013

(54) EXCRETION DISPOSAL SHEET FOR PET ANIMALS

(75) Inventors: Yasuhiro Sasano, Ehime (JP); Takeshi Ikegami, Ehime (JP)

(73) Assignee: Unicharm Corporation, Ehime (JP)

( * ) Notice: Subject to any disclaimer, the term of this patent is extended or adjusted under 35 U.S.C. 154(b) by 202 days.

(21) Appl. No.: 13/061,209

(22) PCT Filed: Aug. 27, 2009

(86) PCT No.: PCT/JP2009/064912
§ 371 (c)(1),
(2), (4) Date: Feb. 28, 2011

(87) PCT Pub. No.: WO2010/024308
PCT Pub. Date: Mar. 4, 2010

(65) Prior Publication Data
US 2011/0146581 A1 Jun. 23, 2011

(30) Foreign Application Priority Data
Aug. 29, 2008 (JP) ................. 2008-220846

(51) Int. Cl.
*A01K 23/00* (2006.01)
*A01K 29/00* (2006.01)
(52) U.S. Cl.
USPC .......................................... 119/171; 119/169
(58) Field of Classification Search
USPC ................. 119/171, 172, 163, 169, 161, 170, 119/165, 166, 167, 28.5, 526; 604/378, 358, 604/385.01, 359, 370, 380, 317, 379, 367
See application file for complete search history.

(56) References Cited

U.S. PATENT DOCUMENTS

| | | | | |
|---|---|---|---|---|
| 2,788,003 | A * | 4/1957 | Morin | 604/366 |
| 3,284,273 | A * | 11/1966 | Prentice | 428/76 |
| 3,626,899 | A * | 12/1971 | Spellman | 119/169 |
| 5,630,376 | A * | 5/1997 | Ochi et al. | 119/169 |
| 6,227,145 | B1 | 5/2001 | Miyamoto et al. | |
| 7,686,790 | B2 * | 3/2010 | Rasmussen et al. | 604/317 |
| 2002/0017354 | A1* | 2/2002 | Riddell | 156/62.4 |
| 2004/0255869 | A1* | 12/2004 | Matsuo et al. | 119/170 |
| 2005/0166855 | A1 | 8/2005 | Kaneko et al. | |
| 2009/0000561 | A1* | 1/2009 | Takahashi et al. | 119/171 |
| 2009/0044756 | A1* | 2/2009 | Otsuji et al. | 119/169 |
| 2010/0170449 | A1* | 7/2010 | Matsuo et al. | 119/169 |
| 2011/0232578 | A1* | 9/2011 | Duke et al. | 119/172 |

FOREIGN PATENT DOCUMENTS

| | | |
|---|---|---|
| JP | 62-236860 | 10/1987 |
| JP | 05-039258 | * 5/1993 |
| JP | 11-332413 | 12/1999 |
| JP | 2004-346130 | 12/2004 |
| JP | 2005-198598 | 7/2005 |
| JP | 2006-187208 | 7/2006 |

OTHER PUBLICATIONS

International Search Report from corresponding PCT application No. PCT/JP2009/064912 dated Nov. 24, 2009, 4 pgs.

* cited by examiner

*Primary Examiner* — T. Nguyen
(74) *Attorney, Agent, or Firm* — Brinks Hofer Gilson & Lione

(57) ABSTRACT

An excretion disposal sheet for pet animals that contains fragrance adapted to develop aroma effectively masking odor of excretion. The fragrance is in the form of a powder compound wherein the fragrance includes cyclodextrin and this particulate compound is sandwiched between an upper surface of a core material and a liquid-pervious sheet in the form of tissue paper overlying the upper surface.

16 Claims, 4 Drawing Sheets

EXCRETION DISPOSAL SHEET FOR PET ANIMALS

RELATED APPLICATION

This application is a 35 U.S.C. §371 national phase filing of International Patent Application No. PCT/JP2009/064912, filed Aug. 27, 2009, through which and to which priority is claimed under 35 U.S.C. §119 to Japanese Patent Application No. 2008-220846, filed Aug. 29, 2008.

TECHNICAL FIELD

The present invention relates to excretion disposal sheets for pet animals such as dogs and cats.

RELATED ART

Various types of excretion disposal sheets having liquid-absorbing properties and/or deodorizing or odor-masking properties have conventionally proposed for pet animals such as dogs and cats bred indoors. For example, JP 62-236860A (PATENT DOCUMENT 1) discloses a urine-absorbent sheet obtained by sandwiching a mixture of water-soluble resin particles including fragrance and water-absorbent resin particles between two pulp sheets each having a basis mass of 200 g/m².

Patent Document 1: JP 62-236860 A

DISCLOSURE OF THE INVENTION

Problem to be Solved by the Invention

In the case of the urine sheet disclosed in PATENT DOCUMENT 1, the water-soluble resin is solved in urine upon urination by a pet animal and fragrance included in the water-soluble resin develops aroma which functions to mask excretion odor. However, no aroma is developed until urine infiltrates through the pulp sheet to the water-soluble resin and, in consequence, a certain length of time is required for development of aroma. Furthermore, no masking effect can be expected unless developed aroma diffuses through the pulp sheet into the atmosphere. In addition, if the pulp sheet is densified in order to shorten the length of time required for urine to reach the water-soluble resin, a length of time elapsing until aroma diffuses into the atmosphere will be correspondingly lengthen.

It is an object of the present invention to improve the known excretion disposal sheet so that odor of excretion may be masked as rapidly as possible by aroma developed by fragrance upon contact of excretion with the excretion disposal sheet.

Measure to Solve the Problem

According to the present invention, there is provided an excretion disposal sheet for pet animals including a liquid-pervious sheet, a liquid-impervious sheet and a liquid-absorbent core material sandwiched between the sheets and containing fragrance adapted to develop aroma functioning to mask odor of excretion upon contact of the excretion of pet animals with the excretion disposal sheet.

The present invention is characterized as follows: The fragrance is prepared in the form of powder of inclusion compound wherein the fragrance is included by cyclodextrin, the core material has an upper surface lying on the side of the liquid-pervious sheet and a lower surface lying on the side of the liquid-impervious sheet, and the inclusion compound is sandwiched between the upper surface of the core material and the liquid-pervious sheet overlying the upper surface.

According to one embodiment of the present invention, the inclusion compound is provided in a state mixed with superabsorbent polymer discrete particles.

According to another embodiment of the present invention, β-cyclodextrin is used as the cyclodextrin.

According to still another embodiment of the present invention, the core material comprises fluff pulp and the liquid-pervious sheet overlying the upper surface is tissue paper having a basis mass in a range of 10 to 25 g/m².

According to yet another embodiment of the present invention, the core material is a mixture of the fluff pulp and the superabsorbent polymer discrete particles.

According to further another embodiment of the present invention, the core material and the tissue paper are integrated together substantially free from possibility to be peeled off each other in respective bottoms of a plurality of compressed grooves arranged so as to intersect one and another, the disposal sheet is formed with a plurality of liquid-absorbing regions each surrounded by the compressed grooves and having a surface area in a range of 0.05 to 5 cm² and the inclusion compound and the superabsorbent polymer discrete particles sandwiched between the core material and the tissue paper are prevented by the bottoms of the compressed grooves in the liquid-absorbing regions from leaking out of the liquid-absorbing regions.

According to an alternative embodiment of the present invention, the core material is densely compressed to prevent the inclusion compound and the superabsorbent polymer discrete particles from flowing into the core material, and the tissue paper has sufficiently tight tissue to prevent the inclusion compound and the superabsorbent polymer discrete particles from passing therethrough.

According to another alternative embodiment of the present invention, a water-absorptive rate of total quantity of the superabsorbent polymer discrete particles contained in an area of 10 cm×10 cm of the disposal sheet is 60 seconds or shorter as measured by the vortex method.

According to still another alternative embodiment of the present invention, powder of the inclusion compound has a particle diameter in a range of 5 to 50 μm.

Effect of the Invention

In the excretion disposal sheet according to the present invention, fragrance is included by cyclodextrin and this inclusion compound is sandwiched between the upper surface of the liquid-absorbent core material and the liquid-pervious sheet overlying this upper surface. With such a unique arrangement, the inclusion compound is rapidly dissolved in urine upon urination occurring onto this excretion disposal sheet aroma developed by fragrance rapidly diffused through the liquid-pervious sheet into the atmosphere to mask odor of excretion.

IDENTIFICATION OF REFERENCE NUMERALS USED IN THE DRAWINGS

| | |
|---|---|
| 1 | disposal sheet |
| 2 | liquid-pervious sheet (topsheet) |
| 3a | right overhead liquid-pervious sheet (tissue paper) |
| 6 | compressed grooves |
| 6a | bottoms |
| 7 | liquid-impervious sheet (backsheet) |
| 12 | fluff pulp (water-absorbent fibers) |
| 13 | superabsorbent polymer discrete particles (first superabsorbent polymer discrete particles) |
| 16 | core material |
| 16a | upper surface |
| 16b | lower surface |
| 21 | inclusion compound (powder) |
| 22 | superabsorbent polymer discrete particles (second superabsorbent polymer discrete particles) |
| 25 | liquid-absorbing regions |
| A | longitudinal direction |
| B | transverse direction |
| C | thickness direction |

DETAILED DESCRIPTION OF THE PREFERRED EMBODIMENTS

Details of a excretion disposal sheet for pet animals according to the present invention will be more fully understood from the description given hereunder with reference to the accompanying drawings.

Figure 1:
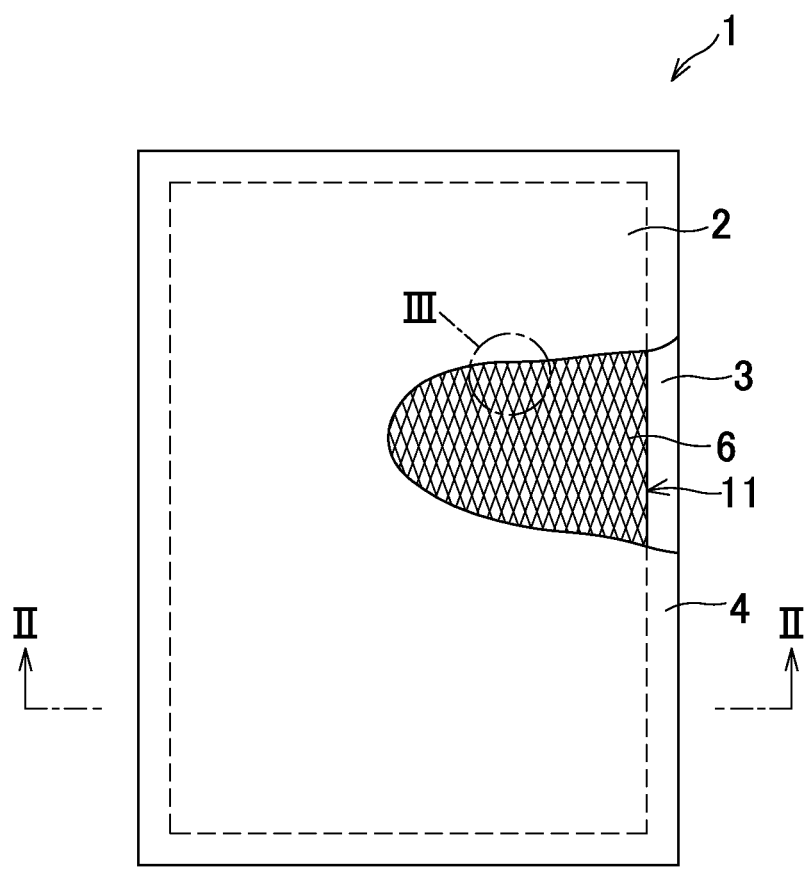
FIG. 1 is a partially cutaway plan view of a disposal sheet.
Figure 1:
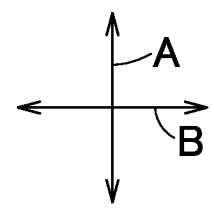

FIG. 1 is a partially cutaway plan view of an excretion disposal sheet 1. The disposal sheet 1 has a longitudinal direction A, a transverse direction B and a thickness direction C (See FIG. 2). A dimension of the sheet 1 is larger in the longitudinal direction A than in the transverse direction B. A top surface of the disposal sheet 1 is defined by a liquid-pervious topsheet 2 and a liquid-pervious first core material covering sheet 3a underlies the topsheet 2. Inside a periphery 4 of the disposal sheet 1, the first core material covering sheet 3 is formed with a plurality of compressed grooves 6 obliquely extending so as to intersect one with another.

Figure 2:
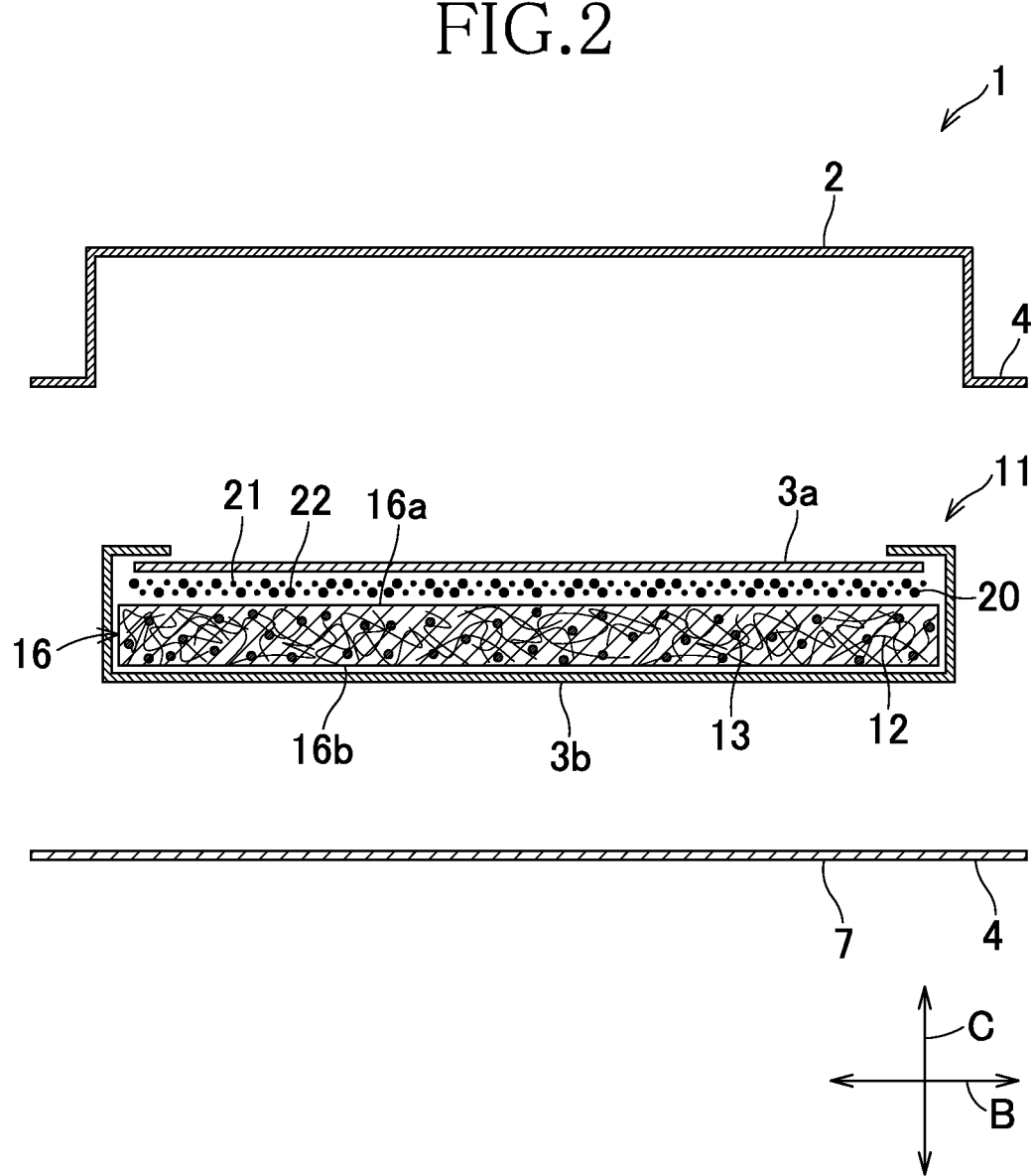
FIG. 2 is a schematic sectional view taken along line II-II in FIG. 1, showing component members as being spaced one from another.

FIG. 2 is a schematic sectional view taken along line II-II in FIG. 1, showing component members actually laminated together as if they are spaced one from another in the thickness direction C for convenience of explanation. It should be appreciated that the compressed grooves 6 are not shown. The disposal sheet 1 includes a liquid-impervious backsheet 7 opposite to the topsheet 2 in the thickness direction C. The topsheet 2 is formed of a nonwoven fabric of thermoplastic synthetic fibers and preferably processed to become hydrophilic. The backsheet 7 is formed of a film of thermoplastic synthetic resin. An absorptive section 11 is defined between the topsheet 2 and the backsheet 7. The absorptive section 11 primarily comprises water-absorbent fibers 12 such as fluff pulp of 40 to 100% by mass and first superabsorbent polymer discrete particles 13 of 60 to 0% by mass and more specifically includes a liquid-absorbent core material 16 which is, for example, an aggregate of liquid-absorbent materials having a basis mass in a range of 50 to 300 g/m², the first core material covering sheet 3a which a liquid-pervious sheet overlying an upper surface 16a of the core material 16, the second core material covering sheet underlying a lower surface 16b of the core material 16 and an aroma developing layer 20 sandwiched between the upper surface 16a of the core material 16 and the first core material covering sheet 3a. The topsheet 2 and the backsheet 7 are put flat and bonded or sealed together directly outside the peripheral edge of the absorptive section 11 to the periphery 4 of the disposal sheet 1. The first core material covering sheet 3a and the second core material covering sheet 3b partially overlap each other to encapsulate the water-absorbent fibers 12 and the first superabsorbent polymer discrete particles 13 and thereby to prevent the water-absorbent fibers 12 and the first superabsorbent polymer discrete particles 13 from leaking out of the absorbent section 11. The first core material covering sheet 3a functions also to make moisture in excretion such as urine having passed through the topsheet 2 disperse in the longitudinal direction A as well as in the transverse direction B. As these first and second core material covering sheets 3a, 3b, tissue paper or the like may be used. The tissue paper preferably has a basis mass in a range of 10 to 25 g/m².

In the absorptive section 11, the aroma developing layer 20 is defined by a mixture of inclusion compound powder 21, more specifically, inclusion compound powder 21 of cyclodextrin including fragrance, and second superabsorbent discrete polymer particles 22. The fragrance included in cyclodextrin may be natural fragrance or synthetic fragrance. The inclusion compound powder 21 may be appropriately added with water-soluble thickening agent such as maltodextrin, pullulan or gum arabic so that each of the powder 21 may have a particle diameter in a range of 5 to 100 μm, preferably in a range of 10 to 50 μm. A quantity of the second superabsorbent discrete polymer particles 22 to be mixed with the inclusion compound powder 21 is in a range of 5 to 100 times of the quantity of the inclusion compound powder 21. The inclusion compound powder 21 and the second superabsorbent polymer discrete particles 22 having been premixed are sprayed on the upper surface 16a of the core material 16 by a quantity of 15 to 110 g/m². The quantity of the inclusion compound powder 21 consumed per unit area of the upper surface 16a is relatively small, for example, in a range of 0.5 to 10 g/m² and the inclusion compound powder 21 may be mixed with the second superabsorbent polymer discrete particles 22 to increase an apparent volume thereof before spraying. In this way, operation of forming the absorptive section 11 can be facilitated. The first superabsorbent polymer discrete particles 13 may have the same composition as that of the second superabsorbent discrete polymer particles 22.

Figure 3:
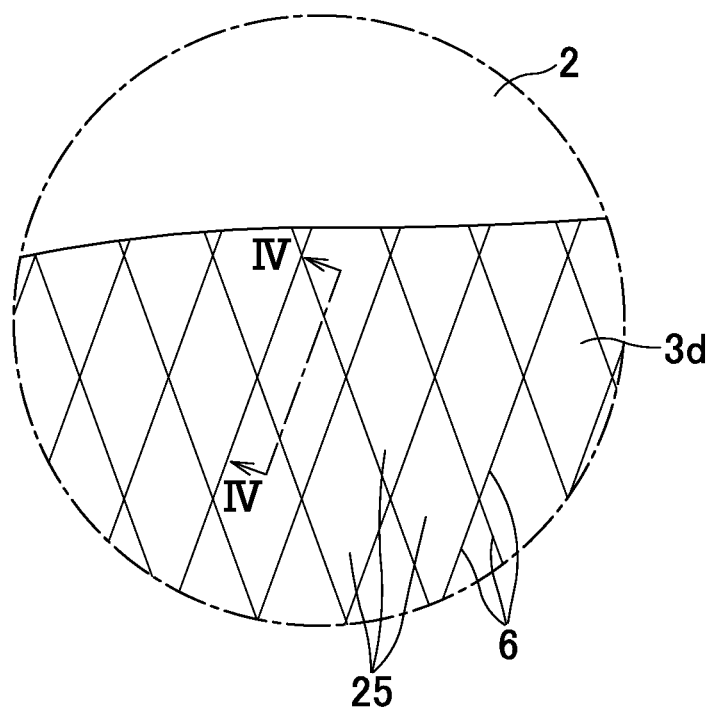
FIG. 3 is a scale-enlarged schematic diagram illustrating a region III circled by chain line in FIG. 1.
Figure 4:
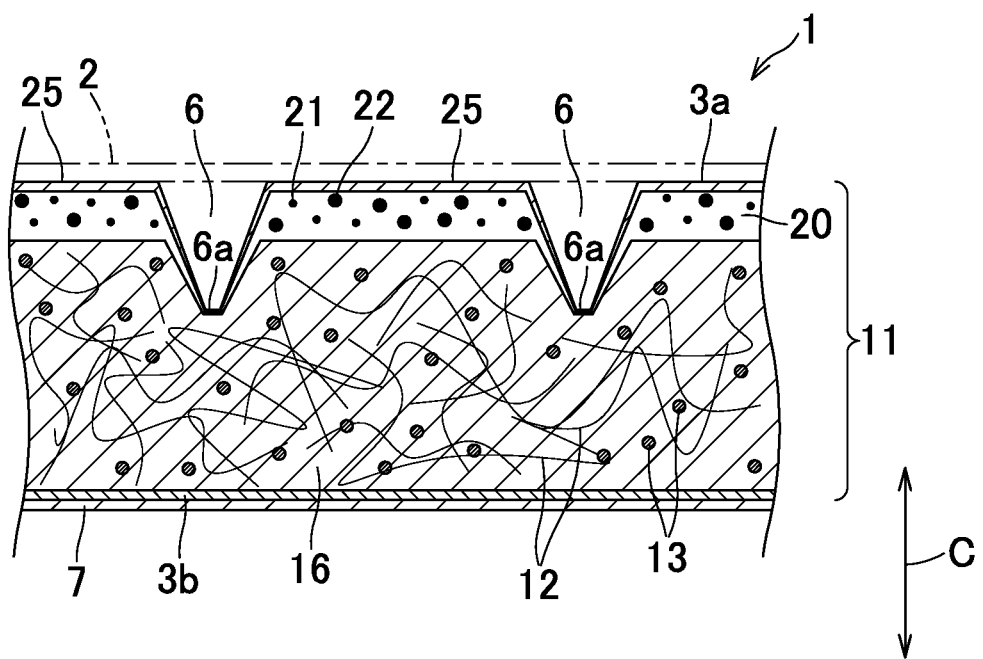
FIG. 4 is a schematic sectional view taken along line IV-IV in FIG. 3.

FIG. 3 is a scale-enlarged schematic diagram illustrating a region III circled by chain line in FIG. 1 and FIG. 4 is a schematic sectional view taken along line IV-IV in FIG. 3. In the schematic sectional view of FIG. 4, the topsheet 2 is indicated by an imaginary line. Referring to FIG. 4 the compressed grooves 6 formed on the absorptive section 11 are formed by compressing the absorptive section 11 from the first core material covering sheet 3a to the second more material covering sheet 3b and, at bottoms 6a of the respective compressed grooves 6, the first core material covering sheet 3a and the core material 16 are tightly kept in contact with each other so that the first core material covering sheet 3a and the core material 16 may be substantially prevented from being peeled off each other. As used herein, the phrase "may be substantially prevented from being peeled off from each other" means that the first core material covering sheet 3a and the core material 16 will not be peeled off from each other so far as the disposal sheet 1 is normally handled or used. Of the plurality of compressed grooves 6, each pair of the adjacent compressed grooves 6 parallelly extending in one direction intersect with the other pair of the adjacent compressed grooves 6 parallelly extending in the other direction to define and the other pair of the adjacent compressed grooves 6 extending in parallel to define a liquid-absorbing region 25. In the respective liquid-absorbing regions 25, the inclusion compound powder 21 including fragrance and the second superabsorbent polymer discrete particles 22 form the aroma developing layers 20 between the first core material covering sheet 3a and the core material 16. The first core material covering sheet 3a formed by tissue paper is of a relatively low tear strength and protectively covered with the topsheet 2. The inclusion compound powder 21 and the superabsorbent polymer discrete particles 22 in the liquid-absorptive section 25 are sealed off by the first core material covering sheet 3a integrated with the core material 16 along the bottoms of the respective compressed grooves 6 in the longitudinal direction A and the transverse direction B, and in the thickness direction C also from above. The tissue paper having a basis mass in a range of 10 to 25 g/m² as has been exemplarily described above has adequately dense tissue to prevent the inclusion compound powder 21 and the second superabsorbent polymer discrete particles 22 from passing through the tissue paper and therefore to be suitable as the first core material covering sheet 3a. In the liquid-absorptive regions 25, the inclusion compound powder 21 and the second superabsorbent polymer discrete particles 22 are in a sufficiently compressed state to prevent the entry of these powder 21, 22 into the core material 16. When fluff pulp is used as the liquid-absorbent fibers, the fluff pulp also is compressed to keep density in a range of 0.03 to 0.15 g/cc. In consequence, even if the disposal sheet 1 is stored in folded or rolled up state until it is actually used, the inclusion compound powder 21 and the second superabsorbent polymer discrete particles 22 should not become a non-uniformly-distributed state. The preferred liquid-absorptive region 25 according to the present invention is dimensioned to have a surface area in a range of 0.05 to 5 cm². With the respective liquid-absorptive regions 25 dimensioned in this manner, urine should not spread over unacceptably wide range and soil a pet animal's foots.

The disposal sheet constructed as has been described above is similar to conventional disposal sheets so far as the manner of utilization is concerned. However, in the case of the disposal sheet according to the present invention, part of urine having been excreted on the sheet and then infiltrated into the liquid-absorptive regions 25 dissolves cyclodextrin which is the component of the inclusion compound powder 21. Thereupon, released fragrance develops aroma and masks odor of urine. The part of urine is then absorbed by the second superabsorbent polymer discrete particles 22 and the core material 16. Upon disappearance of urine from the liquid-absorptive regions 25, cyclodextrin including residual fragrance is recrystallized but a certain quantity of fragrance left free from cyclodextrin still stays in the liquid-absorbent regions 25. Remarkably long-lasting and intense aroma obtained by the disposal sheet according to the present invention is considered to arise out of such residual fragrance left free from cyclodextrin.

If β-cyclodextrin is used as cyclodextrin in the inclusion compound powder 21 and fruity synthetic fragrance is used as fragrance to implement the present invention, the quantity consumed of fragrance is preferably in a range of 5 to 25% by mass of the inclusion compound powder 21.

Figure 5:
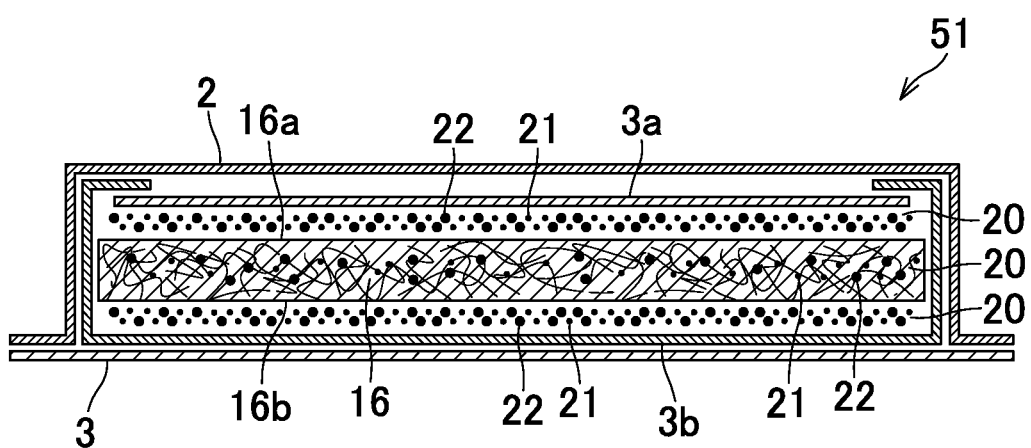
FIG. 5 is a schematic sectional view of a disposal sheet for evaluation.

FIG. 5 is a schematic sectional view of a disposal sheet 51 for evaluation the inventors used to confirm the function and the effect of the inclusion compound powder 21 and the second superabsorbent polymer discrete particles 22. The disposal sheet for evaluation was dimensioned in 10 cm×10 cm and fluff pulp having a basis mass of 120 g/m² was used as the core material 16. Floral-fruity fragrance "TF23102" supplied from INF Japan Corporation was used as fragrance included in the inclusion compound powder 21 defining the aroma developing layer 20, and β-cyclodextrin was used as cyclodextrin. The inclusion compound (hereinafter abbreviated to CD) consisting of β-cyclodextrin and this fragrance were prepared by the following steps of:

1) adding β-cyclodextrin of 36 parts and fragrance of 4 part to water of 60 parts and leaving this mixture at rest for 24 hours after stirring for 30 minutes; and 2) after stirring further for 1 minute, treating the mixture by spray drier having an exit temperature set to 95° C. to obtain powder of inclusion compound (CD) having a particle diameter of about 5 μm.

As the second superabsorbent polymer discrete particles 22 constituting the aroma developing layer 20 in the disposal sheet for evaluation, UG- 320P and/or UG- 840D were used.

In the disposal sheet 51 for evaluation, the inclusion compound powder 21 and the superabsorbent polymer discrete particles 22 cooperating to define the aroma developing layer 20 were selectively distributed on the upper surface 16a or the lower surface 16b or generally in the middle of the core material 16 as viewed in the thickness direction of the core material 16. The laminate obtained in this manner was compressed under a pressure of 20 kg/cm² for 3 seconds, then the laminate was further compressed by press die under pressure of 20 kg/cm² for 17 seconds to form the liquid-absorbing regions 25 each dimensioned to be 1 cm×1 cm and finally the laminate was covered with the topsheet 2 and the backsheet 7.

TABLE 1 indicates aroma development intensity and water absorption rate (sec) of used superabsorbent polymer discrete particles as measured by the vortex method in INVENTIVE EMBODIMENTS and COMPARATIVE EMBODIMENTS both using the disposal sheet 51 for evaluation.
[Table 1]

TABLE 1

| | | Positions of inclusion compound and polymer particles | | | | | | | | | | | | | |
|---|---|---|---|---|---|---|---|---|---|---|---|---|---|---|---|
| Inventive Ex. No. | Comparative Ex. No. | Upper surface of core material (g/piece) | | | Interior of core material (g/piece) | | | Lower surface of core material (g/piece) | | | Elapsed time after water absoption (minutes) and Aroma development intensity (odor value) | | | | Vortex |
| | | CD | UG-840D | UG-320P | CD | UG-840D | UG-320P | CD | UG-840D | UG-320P | 1 | 10 | 30 | 60 | 120 | (seconds) |
| 1 | | 0.016 | 0.8 | — | — | — | — | — | — | — | 627 | 489 | 227 | 250 | 208 | 104.5 |
| 2 | | 0.032 | 0.8 | — | — | — | — | — | — | — | 744 | 472 | 316 | 295 | 257 | 104.5 |
| 3 | | 0.016 | 0.4 | — | — | 0.4 | — | — | — | — | 692 | 650 | 350 | 272 | 220 | 104.5 |

TABLE 1-continued

| Inventive Ex. No. | Comparative Ex. No. | Upper surface of core material (g/piece) | | | Interior of core material (g/piece) | | | Lower surface of core material (g/piece) | | | Elapsed time after water absoption (minutes) and Aroma development intensity (odor value) | | | | | Vortex |
|---|---|---|---|---|---|---|---|---|---|---|---|---|---|---|---|---|
| | | CD | UG-840D | UG-320P | CD | UG-840D | UG-320P | CD | UG-840D | UG-320P | 1 | 10 | 30 | 60 | 120 | (seconds) |
| 4 | | 0.016 | 0.4 | — | — | — | — | — | 0.4 | — | — | 478 | 597 | 502 | 400 | 104.5 |
| 5 | | 0.016 | 0.4 | — | — | — | — | — | — | — | 521 | 407 | 321 | 152 | 210 | 300.0 |
| 6 | | 0.016 | 0.6 | — | — | — | — | — | — | — | 436 | 482 | 365 | 148 | 199 | 222.6 |
| 7 | | 0.016 | 1.0 | — | — | — | — | — | — | — | 888 | 590 | 304 | 190 | 235 | 72.7 |
| 8 | | 0.016 | 1.2 | — | — | — | — | — | — | — | 1,044 | 740 | 374 | 235 | 231 | 60.0 |
| 9 | | 0.016 | 1.5 | — | — | — | — | — | — | — | 888 | 641 | 378 | 289 | 288 | |
| | 1 | 0.008 | 0.8 | — | — | — | — | — | — | — | 411 | 441 | 207 | 236 | 180 | 104.5 |
| | 2 | — | — | — | 0.016 | 0.8 | — | — | — | — | 181 | 181 | 146 | 200 | 179 | 104.5 |
| | 3 | — | — | — | — | — | — | 0.016 | 0.8 | — | 121 | 225 | 213 | 268 | 237 | 104.5 |
| | 4 | — | 0.8 | — | — | — | — | 0.016 | — | — | 331 | 296 | 260 | 218 | 190 | |
| | 5 | 0.016 | — | — | — | — | — | — | 0.8 | — | 352 | 500 | 323 | 297 | 190 | 104.5 |
| | 6 | 0.016 | — | — | — | 0.8 | — | — | — | — | 501 | 663 | 465 | 301 | 185 | 104.5 |
| | 7 | 0.016 | — | — | — | — | — | — | — | — | 377 | 181 | 192 | 135 | 108 | — |
| 10 | | 0.016 | — | 0.4 | — | — | — | — | — | — | 932 | 565 | 573 | 602 | 474 | 12.8 |
| 11 | | 0.016 | — | 0.6 | — | — | — | — | — | — | 1,082 | 714 | 580 | 502 | 434 | 7.4 |
| 12 | | 0.016 | — | 0.8 | — | — | — | — | — | — | 1,248 | 814 | 788 | 681 | 558 | 6.0 |
| 13 | | 0.016 | — | 1.0 | — | — | — | — | — | — | 1,304 | 929 | 899 | 792 | 608 | 4.5 |
| 14 | | 0.016 | — | 1.2 | — | — | — | — | — | — | 1,241 | 868 | 874 | 792 | 740 | 3.5 |
| 15 | | 0.016 | — | 1.5 | — | — | — | — | — | — | 1,351 | 977 | 952 | 877 | 865 | 3.4 |
| 16 | | 0.016 | 0.4 | 0.4 | — | — | — | — | — | — | 854 | 680 | 447 | 258 | 244 | 12.8 |
| 17 | | 0.016 | 0.4 | — | — | — | 0.4 | — | — | — | 812 | 954 | 731 | 653 | 484 | 12.8 |
| 18 | | 0.016 | 0.4 | — | — | — | — | — | — | 0.4 | 815 | 615 | 512 | 542 | 413 | 12.8 |
| 19 | | 0.016 | — | 0.4 | — | — | — | — | 0.4 | — | 963 | 810 | 657 | 508 | 348 | 12.8 |
| 20 | | 0.016 | — | 0.4 | — | — | — | — | — | 0.4 | 1,042 | 728 | 615 | 571 | 461 | 12.8 |

The higher the aroma development intensity value, the higher the masking effect against odor is and it is preferred that this intensity value is not significantly lowered as time (minutes) elapses. The inventors found that, of the disposal sheets 51, those which exhibit aroma development intensity of 200 or higher at a time point 1 minute and 120 minutes after aroma development will be able to provide the masking effect required in practical use. To assure such masking effect, the water-absorption rate of the superabsorbent polymer discrete particles should be preferably 60 seconds or shorter as measured by a so-called vortex method, as will be apparent from TABLE 1. The evaluation suggested that the superabsorbent polymer discrete particles exhibiting a rapid water-absorption rate can produce the desired effect higher than the polymer particles exhibiting a slower water-absorption rate can produce.

Measurement of the aroma development intensity was conducted by the following steps of:

1) setting the measurement environment to a temperature of 25° C. and a R. H. of 50%;

2) preparing a lidded quadrangular container having a bottom defined by four sides each dimensioned in a range of 12 to 15 cm and forming the lid with a through-hole having a diameter of 4 mm;

3) numerically balancing the odor measuring device "COSMOS XP-329 (manufactured by New Cosmos ELECTRIC CO., LTD.) and setting an initial value to 200;

4) placing the disposal sheet 51 for evaluation within the container, then uniformly dropping 300 cc of physiological saline serving as artificial urine into the container and leaving the container at rest;

5) closing the lid 1 minute before the measurement time to permit the equalization of odor within the container and, on the measurement time, inserting a measurement nozzle into the container through the through-hole and measuring odor for 30 seconds; and 6) determining a peak value of measurement and subtracting the initial value 200 from the peak value to obtain the aroma development intensity.

Water-absorptive rate of the superabsorbent polymer discrete particles 22 in the disposal sheet 51 for evaluation using so-called vortex method was measured by the following steps of:

1) pouring 30 cc of physiological saline into 200 cc beaker;

2) agitating physiological saline by rotating stirring bar formed by Teflon (™) having a diameter of 8 mm and a length of 30 mm of a magnetic stirrer at 600 rpm; and 3) pouring a predetermined quantity of the superabsorbent polymer discrete particles into the beaker and beginning timekeeping; and 4) continuing agitation, measuring a time period until no vortex is generated in physiological saline and determined this time period as the water-absorbing time (water-absorbing rate).

The invention claimed is:

1. An excretion disposal sheet for pet animals that comprises:
   a liquid-absorbent core material sandwiched between a liquid-previous sheet and a liquid-impervious sheet; and
   a fragrance that develops an aroma to mask odor of pet animal excretion upon contact of the pet animal excretion with said excretion disposal sheet,
   wherein,
   said fragrance is in the form of powder compound that includes cyclodextrin;
   said fragrance powder compound is sandwiched between said core material and said liquid-pervious sheet said excretion disposal sheet has a plurality of compressed grooves formed by compressing said excretion disposal sheet from said liquid-previous sheet toward said liquid-impervious sheet, said plurality of compressed grooves being arranged so as to intersect one another;

said core material and said liquid-pervious sheet are integrated together substantially free from possibly being peeled off each other in respective bottoms of said plurality of compressed grooves;

said core material and said liquid-pervious sheet of said disposable sheet are formed with a plurality of liquid-absorbing regions each of which is surrounded by said plurality of compressed grooves and each having a surface area in a range of 0.05 to 5 cm$^2$; and said fragrance powder compound sandwiched between said core material and said liquid-pervious sheet is prevented by said bottoms of said plurality of compressed grooves in said liquid-absorbing regions from leaking out of said liquid-absorbing regions.

2. The disposal sheet defined by claim 1, wherein said fragrance powder compound is provided in a state mixed with superabsorbent polymer discrete particles.

3. The disposal sheet defined by claim 1, wherein the cyclodextrin comprises β-cyclodextrin.

4. The disposal sheet defined by claim 1, wherein said core material comprises fluff pulp and said liquid-pervious sheet overlying said upper surface is tissue paper having a basis mass in a range of 10 to 25 g/m$^2$.

5. The disposal sheet defined by claim 4, wherein said core material is a mixture of said fluff pulp and superabsorbent polymer discrete particles.

6. The disposal sheet defined by claim 1, where both said fragrance powder compound and superabsorbent polymer discrete particles sandwiched between said core material and said liquid-pervious sheet are prevented by said bottoms of said compressed grooves in said liquid-absorbing regions from leaking out of said liquid-absorbing regions.

7. The disposal sheet defined by claim 2, wherein said core material is densely compressed to prevent said fragrance powder compound and superabsorbent polymer discrete particles from flowing into said core material; and said liquid-pervious sheet has comprises sufficiently tight tissue paper to prevent said fragrance powder compound and said superabsorbent polymer discrete particles from passing therethrough.

8. The disposal sheet defined by claim 1, wherein said fragrance powder compound is provided in a state mixed with superabsorbent polymer discrete particles and a water-absorptive rate of total quantity of said superabsorbent polymer discrete particles contained in an area of 10 cm×10 cm of said disposal sheet is 60 seconds or shorter as measured by the vortex method.

9. The disposal sheet defined by claim 1, wherein said fragrance powder compound powder has a particle diameter in a range of 5 to 50 μm.

10. The disposal sheet defined by claim 2, wherein the cyclodextrin comprises β-cyclodextrin.

11. The disposal sheet defined by claim 2, wherein said core material comprises fluff pulp and said liquid-pervious sheet is tissue paper having a basis mass in a range of 10 to 25 g/m$^2$.

12. The disposal sheet defined by claim 3, wherein said core material comprises fluff pulp and said liquid-pervious sheet is tissue paper having a basis mass in a range of 10 to 25 g/m$^2$.

13. The disposal sheet defined by claim 10, wherein said core material comprises fluff pulp and said liquid-pervious sheet is tissue paper having a basis mass in a range of 10 to 25 g/m$^2$.

14. The disposal sheet defined by claim 11, wherein said core material is a mixture of said fluff pulp and said superabsorbent polymer discrete particles.

15. The disposal sheet defined by claim 12, wherein said core material is a mixture of said fluff pulp and superabsorbent polymer discrete particles.

16. The disposal sheet defined by claim 13, wherein said core material is a mixture of said fluff pulp and said superabsorbent polymer discrete particles.

* * * * *